United States Patent [19]

Hardin

[11] Patent Number: 5,585,841
[45] Date of Patent: Dec. 17, 1996

[54] IMAGING SYSTEM WITH AUTOMATIC HARDCOPY COMPENSATION

[75] Inventor: William R. Hardin, Redmond, Wash.

[73] Assignee: Siemens Quantum, Inc., Issaquah, Wash.

[21] Appl. No.: 430,694

[22] Filed: Apr. 28, 1995

Related U.S. Application Data

[63] Continuation of Ser. No. 13,273, Feb. 4, 1993, abandoned.

[51] Int. Cl.⁶ .............................. H04N 5/31; H04N 5/58; G02B 5/12
[52] U.S. Cl. ........................ 348/163; 348/602; 358/527
[58] Field of Search ........................ 358/527; 348/602, 348/603, 163 OR; 345/156; 382/167; H04N 5/31, 9/79, 5/58, 5/12

[56] References Cited

U.S. PATENT DOCUMENTS

| | | | |
|---|---|---|---|
| 4,393,398 | 7/1983 | Horiguchi et al. | 358/527 |
| 4,639,770 | 1/1987 | Jung et al. | 358/527 |
| 4,794,460 | 12/1988 | Shiota | 358/76 |
| 4,952,917 | 8/1990 | Yabuuchi | 348/602 X |
| 4,956,703 | 9/1990 | Uzuda et al. | 358/527 |
| 4,979,032 | 12/1990 | Alessi et al. | 358/527 |
| 5,057,913 | 10/1991 | Nagata et al. | 358/527 |
| 5,081,529 | 1/1992 | Collette | 382/167 |
| 5,237,417 | 8/1993 | Hayashi et al. | 348/565 |

FOREIGN PATENT DOCUMENTS

| | | | |
|---|---|---|---|
| 0145966 | 6/1985 | European Pat. Off. | H04N 5/58 |
| 370384 | 3/1991 | Japan | H04N 9/79 |

*Primary Examiner*—Victor R. Kostak
*Assistant Examiner*—John W. Miller

[57] ABSTRACT

A device and method for producing clinically useful hardcopy or archived records from a real-time imaging system includes a controller which monitors variable settings on the system effecting display monitor images. The controller then compensates the signal sent to the hardcopy recorder or archiving device via gamma curve or Look Up Table (LUT) application and/or directly through recorder brightness and contrast controls.

7 Claims, 4 Drawing Sheets

FIG. 4

RELATIVE RELATIONSHIP BETWEEN ROOM LIGHT AND CONTROL PARAMETERS VERSUS RECORDING DEVICE INPUT COMPENSATION

| ROOM | DISPLAY MONITOR | | SYSTEM CONTROLS | | | RECORDING DEVICE | |
|---|---|---|---|---|---|---|---|
| AMBIENT LIGHT | DISPLAY BRIGHT | DISPLAY CONTRAST | GAIN/TGC | DYN RNG | POWER | VID GAIN | VID OFFSET |

REFERENCE BASELINE SETTINGS, NORMAL ROOM LIGHT

| R | R | R | R | R | R | R | R |
|---|---|---|---|---|---|---|---|

MISADJUSTED CONTROLS TO COMPENSATE FOR ROOM LIGHT

| R+ | R | R | R | R | R | R+ | R+ |
|---|---|---|---|---|---|---|---|
| R+ | R | R | R+ | R | R | R | R- |
| R+ | R | R | R | R+ | R | R- | R |
| R+ | R | R | R+ | R+ | R | R- | R- |
| R+ | R | R | R | R | R+ | R | R- |
| R+ | R | R | R+ | R | R+ | R | R- |
| R+ | R | R | R+ | R+ | R | R- | R- |
| R+ | R | R | R+ | R+ | R+ | R- | R- |
| R+ | R | R | R | R | R | R- | R- |

MISADJUSTED MONITOR AND CONTROLS, INDEPENDENT OF ROOM LIGHT

| R | R+ | R | R | R | R | R | R+ |
|---|---|---|---|---|---|---|---|
| R | R | R+ | R | R | R | R+ | R |
| R | R+ | R+ | R | R | R | R+ | R+ |
| R | R | R- | R | R+ | R | R- | R |
| R | R+ | R | R- | R | R | R | R+ |
| R | R- | R | R+ | R | R | R | R- |
| R | R- | R- | R+ | R+ | R+ | R- | R- |
| R | R | R+ | R | R- | R | R+ | R |

CRT ADJUSTED TO COMPENSATE FOR INCREASED ROOM LIGHT

| R+ | R+ | R | R | R | R | R- | R |
|---|---|---|---|---|---|---|---|
| R+ | R | R+ | R | R | R | R- | R- |
| R+ | R+ | R+ | R | R | R | R | R |

R = REFERENCE OR BASELINE OPTIMAL SETTING
R+ = LEVEL ABOVE REFERENCE OR BASELINE SETTING
R- = LEVEL BELOW REFERENCE OR BASELINE SETTING

THESE RELATIONSHIPS ARE INDEPENDENT OF PRE/POST PROCESSING AND GAMMA FUNCTIONS

IMAGING SYSTEM WITH AUTOMATIC HARDCOPY COMPENSATION

CROSS-REFERENCE TO RELATED APPLICATION

This is a continuation of U.S. patent application, Ser. No. 08/013,273, filed Feb. 4, 1993, for "Imaging System with Automatic Hardcopy Compensation," now abandoned.

FIELD OF THE INVENTION

The present invention relates to diagnostic imaging systems, and more particularly to an imaging system and method in which an image recording device, such as a hardcopy recorder, is automatically compensated to produce a permanent image record comparable to that appearing on the system's display monitor.

BACKGROUND OF THE INVENTION

Most, if not all, modern, diagnostic imaging units, such as ultrasound, magnetic resonance imaging, x-ray computed tomography, etc. have display monitors on which the user directly views the images produced by the system. The display monitors usually have a combination of brightness and either contrast or "Picture" controls so that the user may set the display parameters to their taste and to allow the user to compensate for different room lighting levels. Imaging sessions may be conducted at various levels of room illumination ranging from darkness to fully illuminated rooms.

Most, if not all, modern, diagnostic imaging systems employ recording devices that take either digital data or analog video as their input and produce hardcopy and/or digitally archived records of the images displayed on the display monitor. The media of hardcopy can be thermal paper, X-ray film, transparencies, 35 mm film, Polaroid film, color dye transfer prints and various other media. Some imaging systems employ digital archiving apparatus in lieu of or in addition to hardcopy recording devices. Images recorded on digital archiving apparatus are typically later displayed on monitors other than the scanning system's display monitor and can also be used to produce a hardcopy. Most hardcopy devices have contrast and brightness (or combined "picture") controls, whereas digital archiving systems have a fixed input requiring precompensation. Some of them have exposure or intensity/saturation controls as well. Most hardcopy devices require a non-linear "Gamma" mapping function to be applied to match or compensate for the particular non-linear response characteristics of the recording unit and the recording media; gamma being generally an expression of the relationship between exposure and resultant image density in the range between minimum and maximum image density. The user, of course, expects the recorded images (or later displayed images from a digital archiving system) to match the initially displayed/viewed image very closely in brightness and contrast. However, the user adjusts the display monitor parameters to compensate for ambient lighting conditions and personal taste without readjusting or compensating the recording devices, so there is little potential for the recorded image to match the independently adjusted displayed image. Note, as used herein, the term recorder includes one or both of a hardcopy display device or a digital picture archiving apparatus.

It is, of course, desirable to match the brightness, contrast and intensity/saturation of the hardcopy image to that of the displayed image as closely as possible. Furthermore, the image matching should exist over the range of adjustment of the display monitor parameters without a continuing need for manually readjusting and compensating the recording device(s) for every ambient light situation or for each user.

It is therefore an object of the present invention to provide a display system and method in which hardcopy or digitally archived record output is comparable (within the limits of the recording device and media) to that which is displayed/viewed on display monitors of the system. It is a further object to provide a diagnostic imaging system in which the hardcopy or digitally archived image is automatically adjusted to yield images comparable to images displayed on the system's display monitor throughout their range of adjustment.

SUMMARY OF THE INVENTION

The problems and disadvantages associated with conventional imaging systems and techniques are overcome by the present invention which includes an imaging system having a scanner, a scan converter, a display monitor and a recorder. A controller monitors at least one display control parameter and controls at least one recording control parameter in response thereto.

BRIEF DESCRIPTION OF THE FIGURES

For a better understanding of the present invention, reference is made to the following detailed description of an exemplary embodiment considered in conjunction with the accompanying drawings, in which:

FIG. 4 is a diagram of logical relationships between room light and control parameters versus recording device input compensation in accordance with the present invention.

DETAILED DESCRIPTION OF THE PREFERRED EMBODIMENTS

Figure 1:
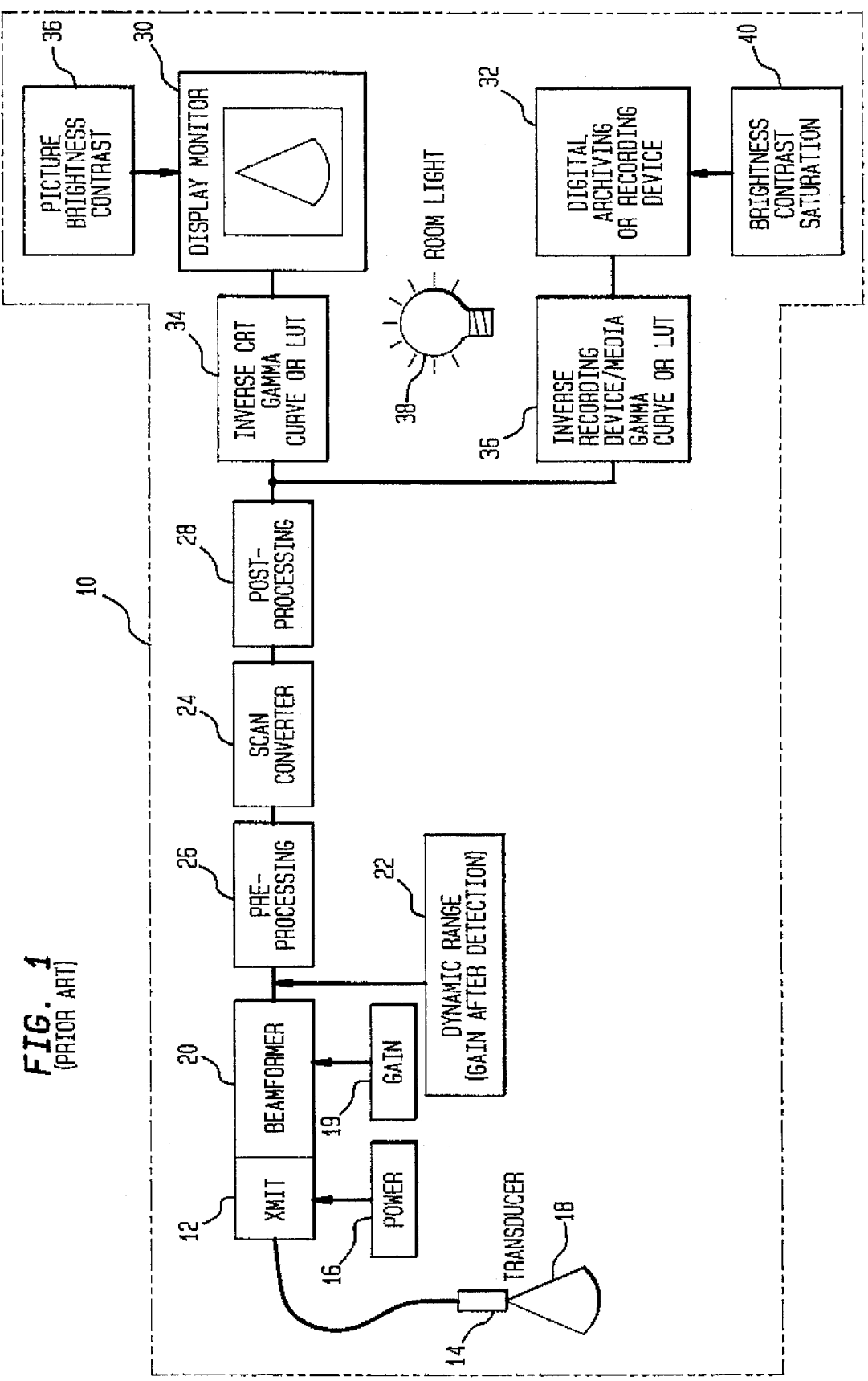
FIG. 1 is a diagram of a generic ultrasound imaging system as is known in the Prior Art.

FIG. 1 shows an ultrasound imaging system 10 having a transmitter 12 for driving an acoustic transducer 14 such that variable electrical power input 16 is converted to controlled acoustic pulses at a selected intensity. The acoustic power or transmitter level may be controlled by a variable attenuator or by variation of power supply voltage. The transducer 14 also receives the echo of the acoustic pulses from the scanned area 18 and translates it to an electrical signal and is therefore a reciprocal device. The electrical signals from the transducer 14 representing raw echo data are reconstructed into meaningful patterns via preamplification, depth compensation for attenuation and a user controlled echo amplification (gain control 19) in the beamformer/receiver 20. A dynamic range control 22 on gain after detection may be provided for echo contrast control. The signal is then manipulated before storage in a scan converter 24 by a preprocessing transfer function 26, e.g., to enhance or suppress echoes in particular ranges. Similarly, post-processing transfer function 28 can be applied to the signal exiting the scan converter 24 prior to display. After post-processing 28, the signal is then ready to be tailored to the response characteristics of the display device via compensation in accord with an inverse gamma curve for the device and its media. The system depicted includes a display monitor 30, e.g., a CRT, and a recording device 32, e.g., a thermal paper printer or a CRT coupled to a camera. Each display or recording device 30, 32 may have a corresponding inverse gamma curve or Look Up Table (LUT) 34, 36 which is applied to the signal in order to optimize the display of the signal. The display monitor 30 likely has brightness, contrast and/or picture controls 36 to adjust the display to suit the user's preference taking into consideration the ambient lighting conditions 38. Recording devices 32 have comparable controls on image quality such as brightness, contrast and/or saturation, intensity and exposure controls 40. The foregoing ultrasound imaging system 10, its components and functions are generally known in the art.

Figure 2:
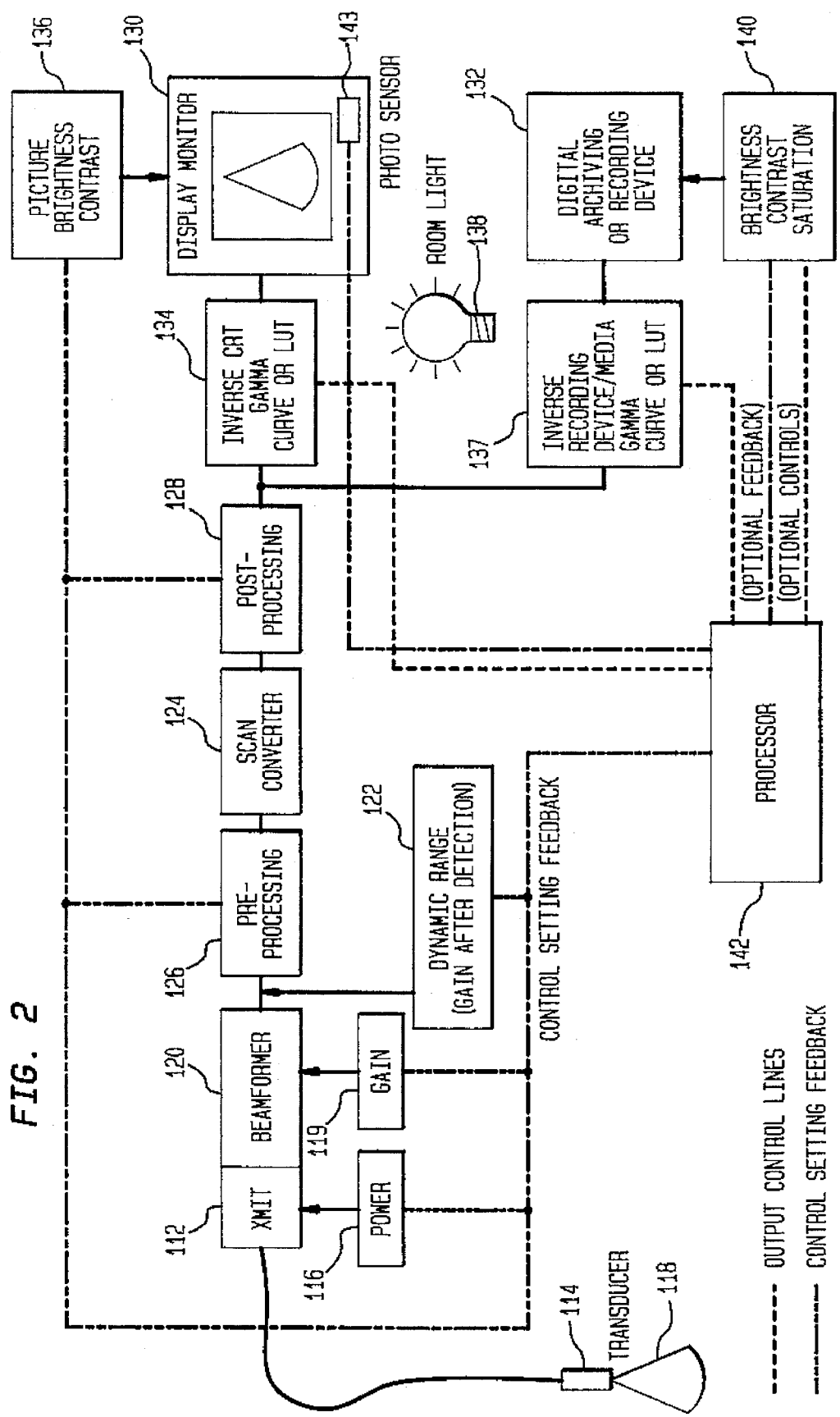
FIG. 2 is a diagram of an ultrasound imaging system in accordance with an exemplary embodiment of the present invention.

FIG. 2 shows an ultrasound imaging system 110 in accordance with the present invention. Elements illustrated in FIG. 2 which correspond to the elements described above with respect to FIG. 1 have been designated by corresponding reference numbers increased by 100.

In accordance with a first exemplary embodiment of the present invention, the system 110 includes a processor 142 which may either be software running in system CPU, a microcontroller, an analog processor circuit or a dedicated microprocessor. The processor 142 receives as input, feedback from the brightness, picture, etc. controls 136 of the display monitor 130 and has output control lines to the Look Up Tables 134, 137 applying the inverse gamma curves to the monitor 130 and recording device 132. If the gamma curve processing is conducted in CPU and processor 142 is CPU resident, such control lines may be viewed as logical. In this manner, the processor 142 may, via a suitable algorithm, alter or enhance gamma curve adjustment of image signal to the recording or archiving device 132 based upon adjustment of the picture, etc. control 136. As a result, the recording device image brightness, contrast, etc. is related to that of the display 130 image. Optionally, processor 142 output may automatically sense upon and reset brightness, etc. control 140 on the recording device 132. Linking the monitor adjustment to the recording device adjustments achieves the objects of present invention. It is preferable, however, to provide additional inputs and outputs to the processor 142 as described below for the following reasons.

First, the background light level 138 in the examination area reflects off of the display monitor face into the user's eye to a degree that varies with the ambient light level and the position of the light source relative to the user and the display monitor 130. Screen reflection changes the user's perception of the displayed contrast and brightness such that not only must the display monitor 130 parameter adjustments be linked to the recording device 132 parameters, but the level of the light reflected from the display screen's surface must also be considered. Secondly, the relationship between the display monitor 130 brightness, contrast (or "Picture") 136 and the recording device control 140 parameters is not necessarily a 1:1 nor even a linear mathematical relationship. The recording controls 140 may even be inversely proportional to the display controls 136. Thirdly, the user has access to several image control adjustments that effect the displayed brightness and contrast as well as the recorded brightness and contrast simultaneously, e.g., power 116, gain 119 and dynamic range 122 controls. These imaging controls may be adjusted by the user in an effort to adjust the display monitor 130 to compensate for ambient room light levels independent of the display monitor settings 136, (whether they are optimal or not). Thus, it is possible to compensate the loss of display monitor 130 viewed image brightness due to reflection of ambient light on the monitor by increasing the image transmit power 116 or receive gain 119. While the display monitor may be acceptably bright, if the recording device 132 brightness (or equivalent control) 140 has not been turned down and the image input to the device is at high gain levels, an unexpectedly saturated hardcopy or archived image results. Accordingly, an imaging system which automatically adjusts hardcopy output to generate record image quality comparable to display monitor images preferably includes a digital processor 142 which:

1) Monitors the user setting/adjustment of the brightness, contrast, and/or "picture" display monitor controls 136;

2) Monitors the user setting/adjustment of the transmit power 116, image gain 119 and contrast or "Dynamic Range" 122 controls;

3) Monitors the currently selected pre- or post-processing curves 126, 128 that are being applied to the displayed and recorded images;

4) Monitors the currently selected recording device 132 and recording media type (i.e., film type), as well as the recording transfer function or "Gamma" curve of the device and the media;

5) Monitors ambient room light 138 directed at the face of the display monitor 130 by an appropriate photosensor 143 (e.g., phototransistor mounted in the display monitor housing bezel/faceplate in the same plane as the face of the display monitor);

6) Controls brightness and contrast via the Gamma mapping function 137 of the data or video that will go to the recording device 132. Alternatively, the processor 142 can control the brightness, contrast, saturation and exposure time (film) parameters of the recording device 132 directly via controls 140 to obtain the same effects, save non-linear function mapping of image data.

The processor 142 preferably automatically tracks each of the foregoing parameters and compensates either the signal sent to the recording device (including, alternatively, a digital picture archiving system), and/or the controls of the recording device to optimize the fully processed image data recording on a specific media to match the displayed image on the system CRT. The algorithms to accomplish compensation are simply direct compensation curves for the given effect on the display monitor, with weighting factors for both monitor brightness/contrast/picture settings and the amount of room ambient light directed at the display monitor. High brightness/contrast/picture settings in a high ambient light situation will require little or no recording device compensation, as the room light glare offsets the monitor settings. If the same monitor settings are used in low ambient light, no recording media compensation will result in the recorded or archived image appearing much darker and less saturated than the displayed monitor image. Therefore, high CRT drive setting with low ambient light requires a compensation that increases recording media brightness, contrast, and/or saturation. The specific mathematical formulas will vary with film type, recording device, display monitor type and drive capability.

Figure 3:
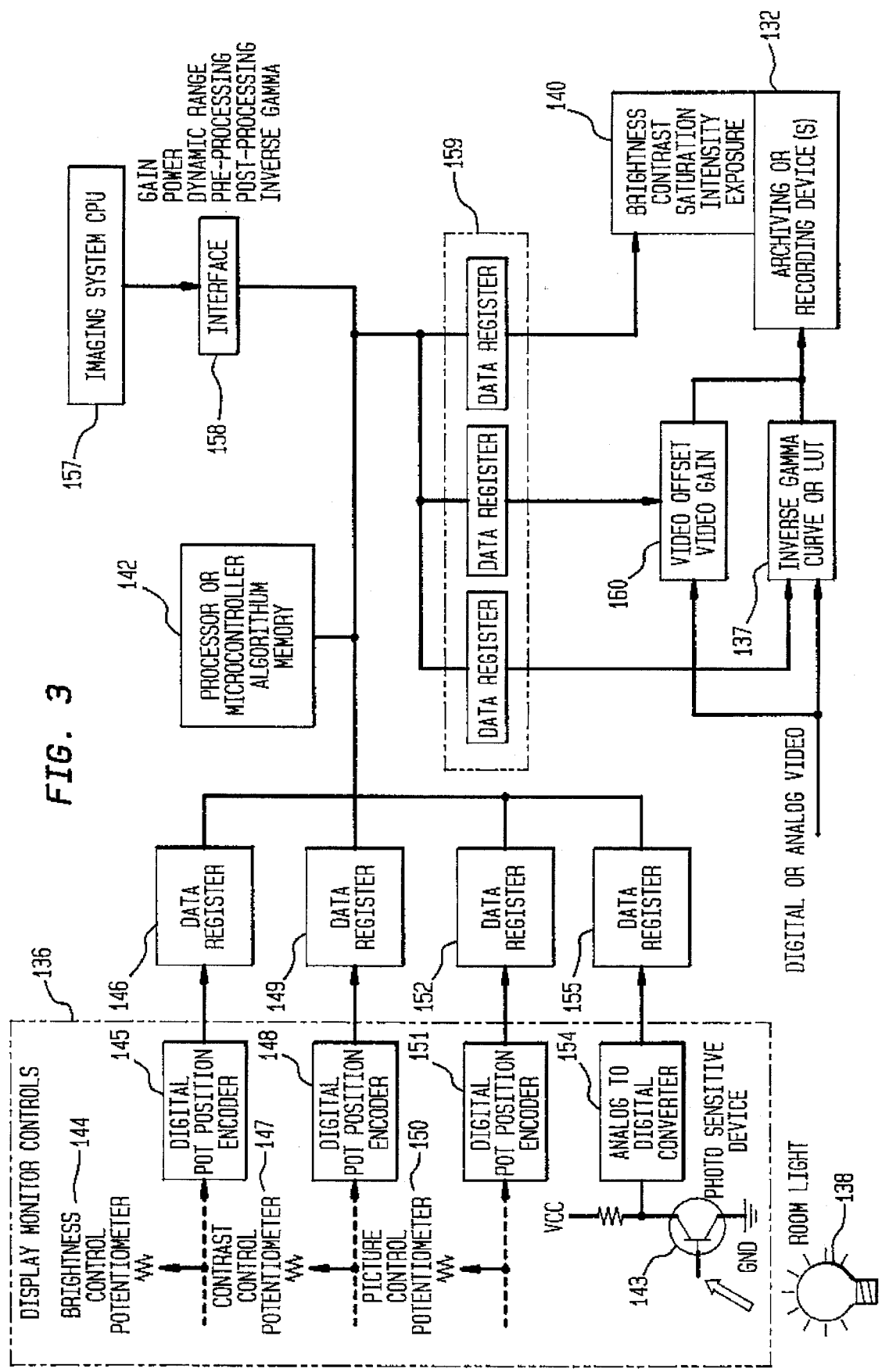
FIG. 3 is a diagram depicting one type of auto compensation apparatus according to this invention.

Referring to FIG. 3, there is shown a simple block diagram depicting an apparatus for implementing the invention described in the foregoing paragraphs.

The apparatus is provided with means for gathering input parameters such as those relating to display monitor adjustments.

As indicated above, the user has access to various display monitor controls 136. These include brightness 144, contrast 147, and/or picture 150 controls. Typically, these are potentiometers. Position or setting feedback for these potentiometers may be obtained in several ways, including mechanical position encoders and analog signal or resistance measurements of the potentiometer itself. FIG. 3 shows a mechanical optical encoder device wherein three position encoders 145, 148, 151, yield digital position outputs for the Processor 142, via the data registers 146, 149, 152, for the three user adjustable pots 144, 147, 150. For sensing ambient light level, this embodiment includes a photosensitive device 143, mounted near the face of the display monitor and mounted in the same plane as the monitor face to best pick up light 138 directed at the face of the monitor (FIG. 2, 130). This could be any type of photosensitive device with voltage, current, resistance, or digital output. In this embodiment, a photo transistor with a voltage output 143 is shown with its output applied to an Analog To Digital Converter 142. The output of the ADC is then made available to the Processor 156 via the data register 155. The embodiment depicted in FIG. 3 also processes imaging system control settings as inputs and includes an interface 158 to the CPU or controller 157 of the imaging system in order to obtain the settings/values (in digital form) for Gain (119 FIG. 2), Transmit Power (116 FIG. 2), Dynamic Range (122 FIG. 2), Pre-Processing (126 FIG. 2), Post Processing (128 FIG. 2), Display CRT Gamma Correction (134 FIG. 2), and Recording Device Gamma Correction or Look Up Table Data (137 FIG. 2).

FIG. 4 shows an exemplary set of logical relationships between reference or baseline conditions and settings and what effect on the video data sent to the recording device that a change in any one parameter should cause. Thus, the apparatus of FIG. 3 using the inputs mentioned above would then apply the relationships presented in FIG. 4 to determine the optimal video output compensation. This is accomplished by the processor sending the appropriate digital control words via the data registers 159 for the video prior to output to the recording device via analog processing 160 and digital Look Up Table 161 and for the controls of the recording device(s) 162.

It should be understood that the embodiments described herein are merely exemplary and that a person skilled in the art may make many variations and modifications without departing from the spirit and scope of the invention as defined in the appended claims. For example, systems which monitor fewer or greater components may well fall within the scope of the present invention so long as automatic compensation of recording device image parameters are effected. Also included, for example, is the automatic compensation of a digital image sent to an image archiving system (PAC). For example, an analog image can be pre-processed by controlling the A/D converter threshold level. This will control the brightness of the archived image. Similarly, the present invention may be practiced on imaging systems other than ultrasound systems. Further, multiple recording devices of the same or of different types may be incorporated into a single imaging system and controlled in accordance with the present invention. In this instance, the plural recorders may be controlled by associated video output compensation circuitry or may share common output circuitry on a time multiplexing basis.

I claim:

1. A method for generating display and recorded images of a scanned area with an ultrasound imaging system, the method comprising the steps of:

generating a variable power signal and a transmit signal received at a transmitter;

receiving the transmit signal at a transducer and converting the transmit signal into ultrasound output to the scanned area;

receiving ultrasound echoes from the scanned area at the transducer and converting the echoes into electrical signals;

transforming the electrical signals into patterns of ultrasound data based upon a gain control signal;

deriving a postprocessing signal from the patterns;

compensating the postprocessing signal by applying first gamma conversion data to generate a compensated postprocessing signal;

receiving the compensated postprocessing signal at a display having brightness and contrast controls;

generating display images at the display in response to the compensated postprocessing signal and the brightness and contrast controls;

detecting ambient light level at the display with a sensor, the sensor generating an ambient light signal in response to detected ambient light;

recording an image corresponding to the display images, the recorder having a gamma mapping function based upon second gamma conversion data;

monitoring by a processor the variable power signal, gain control signal, applied first gamma conversion data, display brightness and contrast controls, and ambient light signal, the processor in response automatically selecting second gamma conversion data that is applied to the postprocessing signal to generate a recorder-compensated postprocessing signal, the recorder-compensated postprocessing signal defining the recorded image.

2. The method of claim 1, in which the processor selects the second gamma data as a function of changes in the monitored data, monitored controls and monitored signals relative to baseline values.

3. An ultrasound imaging system for generating display and recorded images of a scanned area, comprising:

a transmitter that receives a variable power signal and a transmit signal;

a transducer that receives the transmit signal and converts the transmit signal into ultrasound output to the scanned area, the transducer receiving ultrasound echoes from the scanned area and converting the echoes into electrical signals;

a beamformer which transforms the electrical signals into patterns of ultrasound data based upon a gain control signal;

a postprocessing signal derived from the patterns;

means for storing first gamma conversion data, the postprocessing signal compensated by applying first gamma conversion data from the storing means to generate a compensated postprocessing signal;

a display having brightness and contrast controls and receiving the compensated postprocessing signal, the display generating display images in response to the compensated postprocessing signal and the brightness and contrast controls;

a sensor for detecting ambient light level at the display, the sensor generating an ambient light signal in response to detected ambient light;

a recorder which records an image corresponding to a display image, the recorder having a gamma mapping function;

means for storing second gamma conversion data, the second gamma conversion data corresponding to the recorder gamma mapping function; and a processor that monitors the variable power signal, gain control signal, applied first gamma conversion data, display brightness and contrast controls, and ambient light signal, and in response automatically selects second gamma conversion data that is applied to the postprocessing signal to generate a recorder-compensated postprocessing signal, the recorder-compensated postprocessing signal defining the recorded image.

4. The apparatus of claim 3, in which the recorder comprises a hardcopy printing device.

5. The apparatus of claim 3, in which the recorder comprises a digital picture archiving apparatus.

6. The apparatus of claim 3, in which the second gamma conversion data storing means comprises a look-up table.

7. The apparatus of claim 3, in which the processor selects the second gamma data as a function of changes in the monitored data, monitored controls and monitored signals relative to baseline values.

* * * * *